US012704600B2

(12) United States Patent
Robertson, Jr. et al.

(10) Patent No.: US 12,704,600 B2
(45) Date of Patent: Aug. 11, 2026

(54) SENSOR ASSEMBLY

(71) Applicant: Ford Global Technologies, LLC, Dearborn, MI (US)

(72) Inventors: Michael Robertson, Jr., Garden City, MI (US); Shiyamkumaran Neelakandan, Porur (IL); Venkatesh Krishnan, Canton, MI (US); Rashaun Phinisee, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 886 days.

(21) Appl. No.: 18/151,501

(22) Filed: Jan. 9, 2023

(65) Prior Publication Data

US 2024/0230846 A1 Jul. 11, 2024

(51) Int. Cl.
*G01S 7/481* (2006.01)
*G01S 7/02* (2006.01)

(52) U.S. Cl.
CPC ............ *G01S 7/4813* (2013.01); *G01S 7/027* (2021.05)

(58) Field of Classification Search
CPC .................. G01S 7/4813; G01S 7/027; G01S 2007/4977; G01S 2013/93273; G01S 2013/93274; G01S 2013/93275; G01S 17/931; G01S 203/93274; B60S 1/54; B60S 1/56; B60R 11/00; B60R 2011/004; B01D 46/58; G01D 11/00; G01D 11/24; G01D 11/245; H05K 5/0213; H05K 7/20145; B60Q 9/002
USPC ...... 73/431, 597, 620–631, 714, 756, 866.5; 348/61, 135–142, 148, 149
See application file for complete search history.

(56) References Cited

U.S. PATENT DOCUMENTS 10,912,182 B2 2/2021 Han et al.
2015/0360619 A1* 12/2015 Barthel .................. B60R 11/04 348/148
2018/0015908 A1 1/2018 Rice
2019/0219690 A1* 7/2019 Fujita ........................ G01S 7/02
2021/0001794 A1* 1/2021 Umeki .................. B60R 19/483
(Continued)

FOREIGN PATENT DOCUMENTS

CN 109747593 A * 5/2019 ......... G02B 27/0006
CN 216863554 U * 7/2022 ........... G01S 7/4813
(Continued)

OTHER PUBLICATIONS

Krishnan, "Self-Driving Bugaloo: How Ford Is Keeping Autonomous Car Sensors Squeaky Clean", Published in Self-Driven, Sep. 4, 2019.

(Continued)

*Primary Examiner* — Robert R Raevis
(74) *Attorney, Agent, or Firm* — Frank A. MacKenzie; Brooks Kushman P.C.

(57) ABSTRACT

A sensor assembly includes a housing defining a chamber and a sensor positioned in the chamber. The housing includes a wall. The wall includes a recessed portion. The recessed portion includes a port. The sensor has a field of view extending through the port. The recessed portion includes an opening to the chamber, and the opening is spaced from the port in a first direction. The wall includes a vent to the chamber, and the vent is spaced from the recessed portion in the first direction.

20 Claims, 4 Drawing Sheets

(56) References Cited

U.S. PATENT DOCUMENTS

| | | | |
|---|---|---|---|
| 2021/0063540 | A1 | 3/2021 | Krishnan et al. |
| 2021/0341584 | A1 | 11/2021 | Ren et al. |
| 2022/0135005 | A1 | 5/2022 | Yautz |

FOREIGN PATENT DOCUMENTS

| | | | | | |
|---|---|---|---|---|---|
| DE | 102019211898 | A1 | | 2/2021 | |
| JP | 6838809 | B2 | | 3/2021 | |
| JP | 2022155010 | A | * | 10/2022 | ............. B60R 11/04 |
| WO | WO-2021131520 | A1 | * | 7/2021 | ........... G01S 17/931 |
| WO | WO-2022237848 | A1 | * | 11/2022 | ............. B60R 11/00 |

OTHER PUBLICATIONS

Mohammadian et al., "Active prevention of snow accumulation on cameras of autonomous vehicles", SN Applied Sciences (2021) 3:154; https:/doi.org.10.1007/s42452-020-04106-x.

* cited by examiner 130
105
235
205
245
240
220
215
115
225
110
230
210
F
115
145
220
215
245
215
220
115
235

245
215
115
220

SENSOR ASSEMBLY

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (lidar) devices, and/or image processing sensors such as cameras.

DETAILED DESCRIPTION

Figure 1:
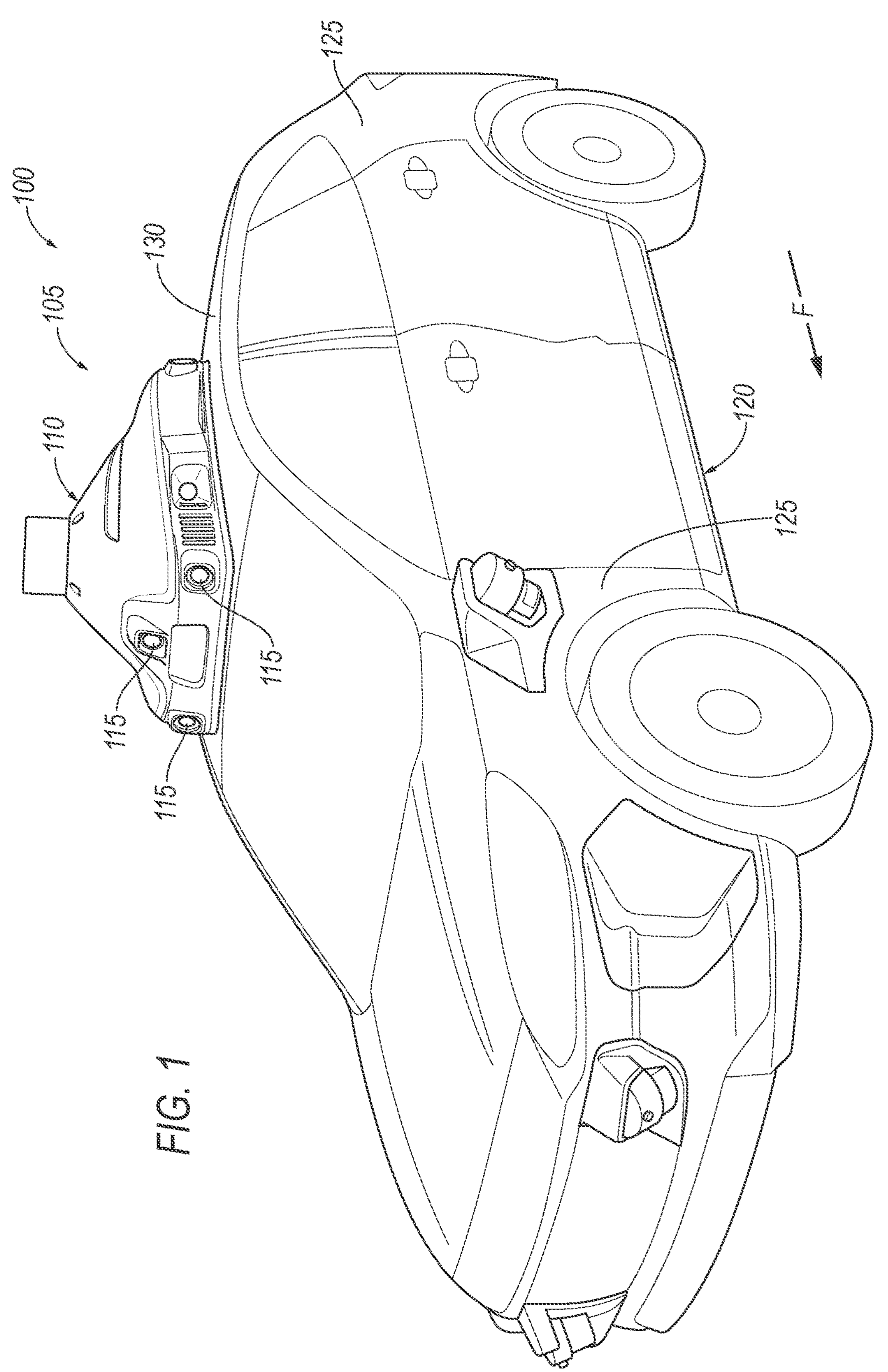
FIG. 1 is a perspective view of an example vehicle with a sensor assembly.

A sensor assembly includes a housing defining a chamber and a sensor positioned in the chamber. The housing includes a wall. The wall includes a recessed portion. The recessed portion includes a port. The sensor has a field of view extending through the port. The recessed portion includes an opening to the chamber, and the opening is spaced from the port in a first direction. The wall includes a vent to the chamber, and the vent is spaced from the recessed portion in the first direction.

In an example, the recessed portion may include an outer edge circumscribing the recessed portion, and the port may be spaced from the outer edge. In a further example, the opening may be spaced from the outer edge.

In a further example, the recessed portion may extend into the chamber from the outer edge to the port.

In an example, the sensor assembly may further include a nozzle aimed at the sensor.

In a further example, the nozzle may be positioned to discharge through the port.

In another further example, the nozzle may be positioned in the chamber.

In another further example, the sensor assembly may further include a blower positioned to supply pressurized air to the nozzle. In a yet further example, the blower may be positioned to draw in air from the chamber. In a still yet further example, the blower may include a blower inlet, and the blower inlet may be positioned in the chamber.

In another yet further example, the sensor assembly may further include a duct positioned to receive pressurized air from the blower and extending through the chamber to the nozzle.

In an example, the first direction may be a horizontal direction.

In an example, the housing may be shaped to be attachable to a body panel of a vehicle. In a further example, the first direction may be a vehicle-forward direction relative to the vehicle when the housing is attached to the body panel of the vehicle. In a yet further example, the vent may face in the vehicle-forward direction when the housing is attached to the body panel of the vehicle.

In another yet further example, the opening may face away from the vehicle-forward direction when the housing is attached to the body panel of the vehicle.

In an example, the sensor may define an axis at a center of the field of view of the sensor, and the sensor is positioned to define a gap along the axis between the sensor and the port.

In a further example, the gap may extend along the port opposite the first direction from the opening.

In another further example, the gap may be open to the chamber.

In another further example, the sensor assembly may further include a nozzle aimed at the sensor, and the nozzle may be positioned in the gap.

With reference to the Figures, wherein like numerals indicate like parts throughout the several views, a sensor assembly 105 of a vehicle 100 includes a housing 110 defining a chamber 205 and a sensor 115 positioned in the chamber 205. The housing 110 includes a wall 210. The wall 210 includes a recessed portion 215. The recessed portion 215 includes a port 220. The sensor 115 has a field of view extending through the port 220. The recessed portion 215 includes an opening 225 to the chamber 205, and the opening 225 is spaced from the port 220 in a first direction F. The wall 210 includes a vent 230 to the chamber 205, and the vent 230 is spaced from the recessed portion 215 in the first direction F.

Locating the sensor 115 in the recessed portion 215 may reduce glare, enhancing the performance of the sensor 115 when the vehicle 100 is in sunlight. While the vehicle 100 is in motion, the shape of the recessed portion 215 may cause turbulence or swirling of the air flowing across the sensor 115, and turbulent or swirling air may disrupt the cleaning of the sensor 115 by applying backpressure against a nozzle 405 aimed at the sensor 115. The interaction of the vent 230, the chamber 205, and the opening 225 may prevent swirling or turbulent air patterns in the recessed portion 215 and thereby reduce the backpressure. The vent 230 permits air to enter the chamber 205, e.g., from forward motion of the vehicle 100. The air may move around the chamber 205 and thereby cool the sensor 115 that is in the chamber 205. The vent 230 may also divert some air that would have flowed across the recessed portion 215. Movement of outside air across the recessed portion 215 may cause a low-pressure zone that draws air out of the chamber 205 through the opening 225. The air exiting through the opening 225 may prevent the outside air flowing across the sensor 115 from swirling back into the recessed portion 215.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a body 120. The vehicle 100 may be of a unibody construction, in which a frame and the body 120 of the vehicle 100 are a single component. The vehicle 100 may alternatively, be of a body-on-frame construction, in which the frame supports the body 120 that is a separate component from the frame. The frame and body 120 may be formed of any suitable material, for example, steel, aluminum, etc.

The body 120 includes body panels 125 partially defining an exterior of the vehicle 100. The body panels 125 may present a class-A surface, e.g., a finished surface exposed to view by a customer and free of unaesthetic blemishes and defects. The body panels 125 include, e.g., a roof 130, etc.

The sensor assembly 105 includes the housing 110 for the sensors 115. The housing 110 is attachable to the vehicle 100, e.g., to one of the body panels 125 of the vehicle 100, e.g., the roof 130. For example, the housing 110 may be shaped to be attachable to the roof 130, e.g., may have a shape matching or following a contour of the roof 130. The housing 110 may be attached to the roof 130, which can provide the sensors 115 with unobstructed fields of view of areas around the vehicle 100. The housing 110 may be formed of, e.g., plastic or metal.

Figure 2:
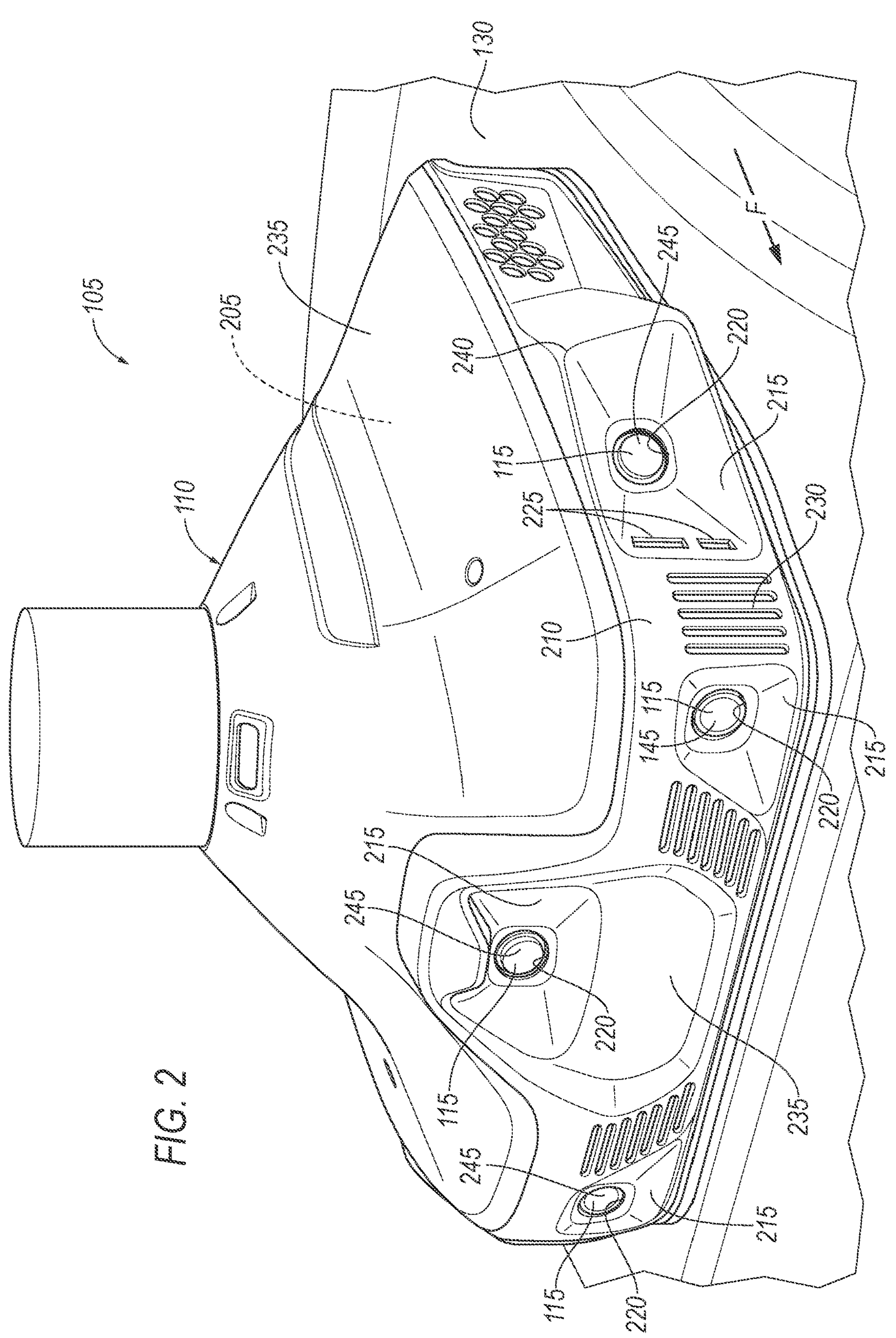
FIG. 2 is a perspective view of the sensor assembly.

With reference to FIG. 2, the housing 110 defines the chamber 205. For example, the housing 110 may include one or more housing panels 235 partially forming the chamber 205 inside the housing 110, and the housing 110 includes the chamber 205 formed at least partially of the housing panels 235. The housing panels 235 form an exterior of the housing 110 and are exposed to the ambient environment. The housing panels 235 include the wall 210, and the wall 210 partially forms the chamber 205. The wall 210 may be oriented generally vertically, e.g., steeper than 45°.

The sensor assembly 105 includes one or more sensors 115. The sensors 115 may detect the external world, e.g., objects and/or characteristics of surroundings of the vehicle 100, such as other vehicles, road lane markings, traffic lights and/or signs, pedestrians, etc. For example, the sensors 115 may include radar sensors, scanning laser range finders, light detection and ranging (lidar) devices, and image processing sensors such as cameras. As cameras, the sensors 115 can detect electromagnetic radiation in some range of wavelengths. For example, the sensors 115 may detect visible light, infrared radiation, ultraviolet light, or some range of wavelengths including visible, infrared, and/or ultraviolet light. For example, the sensors 115 can be a charge-coupled devices (CCD), complementary metal oxide semiconductors (CMOS), or any other suitable type. For another example, the sensors 115 may be time-of-flight (TOF) cameras, which include a modulated light source for illuminating the environment and detect both reflected light from the modulated light source and ambient light to sense reflectivity amplitudes and distances to the scene.

The housing 110 includes a plurality of ports 220. The ports 220 are holes in the housing 110 leading from the chamber 205 to the ambient environment. The ports 220 are through the housing panels 235, e.g., the recessed portion 215 of the wall 210. The housing 110 includes one port 220 for each of the sensors 115. Each sensor 115 has a field of view defined by a sensor lens 245 through the respective port 220 through the respective housing panel 235. Each sensor lens 245 can define an axis A on which the respective port 220 is centered, i.e., the axis A passes through a geometric center of a shape formed by the respective port 220. The port 220 may have a circular shape that is orthogonal to the axis A.

One or more of the housing panels 235, e.g., the wall 210, include one or more recessed portions 215. Each recessed portion 215 can include one of the ports 220. The recessed portions 215 extend inward relative to the housing 110 from the rest of the respective housing panels 235, e.g., into the chamber 205. For example, each recessed portion 215 may include an outer edge 240 circumscribing the recessed portion 215, and the recessed portion 215 may extend into the chamber 205 from the outer edge 240 to the port 220. The port 220 is spaced from the outer edge 240. The port 220 can be positioned at a most recessed point of the recessed portion 215, i.e., a point farthest inward from the rest of the housing panel 235. The recessed portion 215 can extend from the port 220 radially outwardly and axially away from the sensor lens 245 of the sensor 115 relative to the axis A defined by the sensor lens 245. For example, the recessed portion 215 can have a frustoconical or rounded frustopyramidal shape with an apex in the chamber 205 behind the port 220. Positioning the sensor lens 245 of the sensor 115 at the port 220 in the middle of the recessed portion 215 may help reduce glare affecting the sensor 115.

The sensors 115 are positioned in the chamber 205 and have respective fields of view, some of which extend through the respective ports 220. Multiple sensors 115 may be positioned in the same chamber 205. The sensors 115 include the respective sensor lenses 245. The sensor lenses 245 may be convex. Each sensor lens 245 may define the field of view of the respective sensor 115 extending through the port 220 through the housing panel 235, e.g., through the recessed portion 215. Each sensor 115, e.g., each sensor lens 245, defines the respective axis A, around which the sensor lens 245 may be radially symmetric. The axis A extends along a center of the field of view of the respective sensor 115. The axis A can be oriented horizontally, i.e., the sensor 115 can have a field of view extending laterally outward from the vehicle 100. The sensor lens 245 can be recessed from the port 220 along the axis A, i.e., the sensor lens 245 is spaced from the port 220 along the axis A into the chamber 205.

The wall 210 includes one or more vents 230 to the chamber 205. The vents 230 are holes in the housing 110, e.g., the wall 210, leading from the ambient environment to the chamber 205. The vents 230 permit airflow from outside the sensor assembly 105 into the chamber 205. Each vent 230 may include a grate as shown in the Figures and/or a filter. The grate or filter may prevent debris or particulates from entering the chamber 205.

The vent 230 is spaced from the recessed portion 215 in the first direction F. The first direction F may be a horizontal direction, e.g., a vehicle-forward direction relative to the vehicle 100 when the housing 110 is attached to the body panel 125 of the vehicle 100. The vent 230 may face at least partially in the vehicle-forward direction when the housing 110 is attached to the body panel 125 of the vehicle 100. This position of the vent 230 may permit ram air to enter the chamber 205 when the vehicle 100 travels forward.

Each recessed portion 215 includes one or more openings 225 to the chamber 205. The openings 225 are holes in the housing 110, e.g., in the recessed portion 215, leading from the chamber 205 to the ambient environment. The openings 225 are spaced from the respective port 220 in the first direction F, i.e., in a same direction as the respective vent 230 is spaced from the recessed portion 215. The openings 225 are thus between the respective vent 230 and the respective port 220 along the first direction F, e.g., horizontally along the wall 210. The openings 225 are spaced from the respective outer edge 240 of the respective recessed portion 215. In other words, the openings 225 are located on an interior of the recessed portion 215, where the openings 225 are more helpful for disrupting swirling air patterns. The opening 225 may face away from the vehicle-forward direction when the housing 110 is attached to the body panel 125 of the vehicle 100, i.e., at least partially in a vehicle-rearward direction, e.g., in a vehicle-lateral and vehicle-rearward direction. The opening 225 may thus be in a position where air would curl around the leading outer edge 240 of the recessed portion 215 into the recessed portion 215, where the opening 225 may be useful for disrupting that air pattern.

Figure 3:
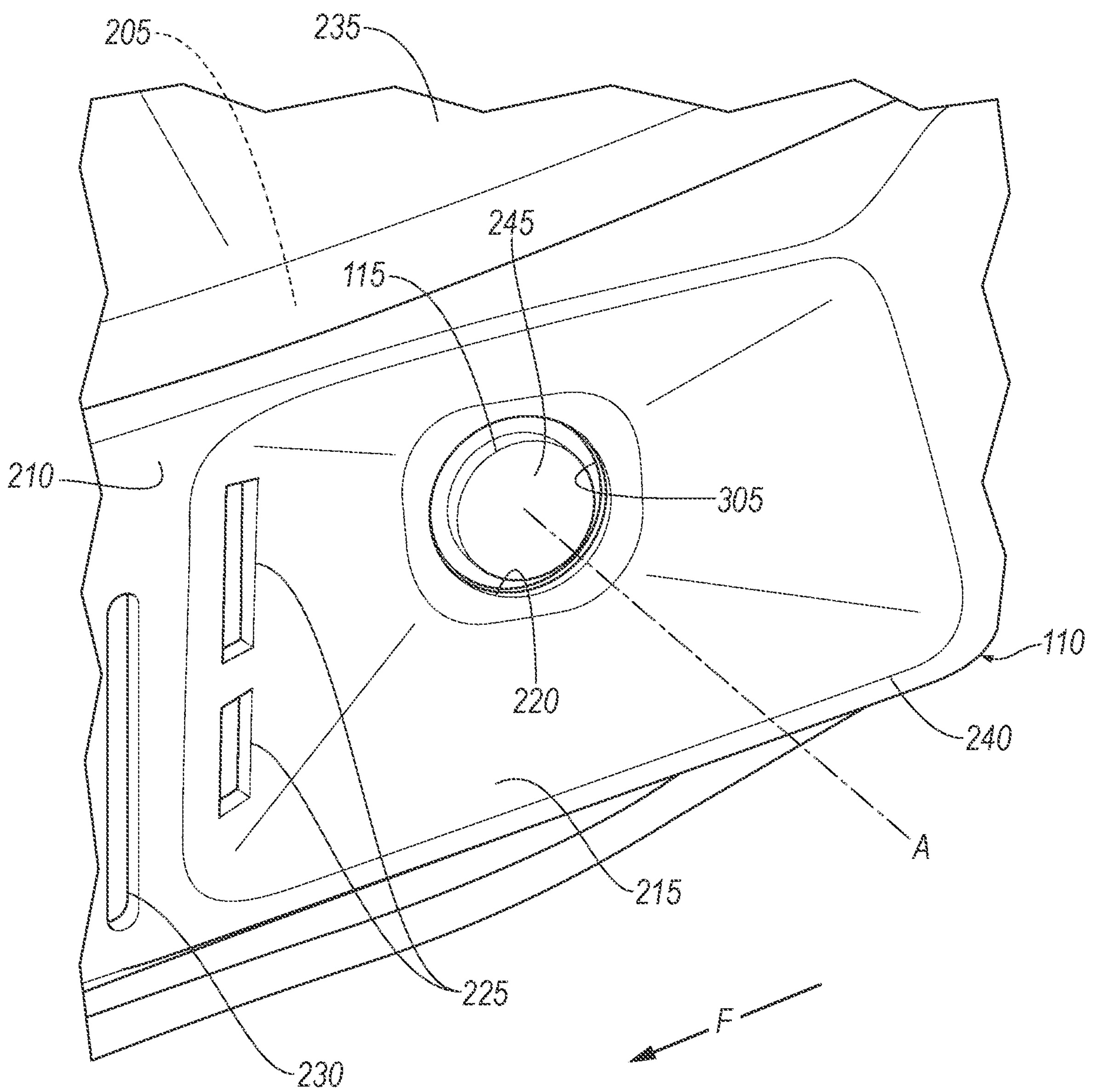
FIG. 3 is a perspective view of a portion of the sensor assembly.

With reference to FIG. 3, the openings 225 in a given recessed portion 215 may extend from above a top of the port 220 to below a bottom of the port 220. The openings 225 in a given recessed portion 215 may collectively extend vertically for more than half a height of the recessed portion 215, i.e., a majority of a height of the recessed portion 215. The vertical extent of the openings 225 may make the openings 225 more effective at disrupting the swirling air patterns. For example, the openings 225 may have a slot shape, i.e., that is significantly longer in one direction than in another perpendicular direction. The openings 225 may be elongated vertically, i.e., perpendicular to the first direction F.

The sensor 115 may be positioned to define a gap 305 along the axis A between the sensor 115 and the port 220. For example, the port 220 and the sensor lens 245 may define the gap 305. The gap 305 may be open to the chamber 205, e.g., may permit air flow over the sensor lens 245 to enter the chamber 205. The gap 305 may extend along the port 220 at least on a side of the port 220 opposite the first direction F from the opening 225, e.g., a vehicle-rearward side of the port 220. The gap 305 may be positioned on an opposite lateral side of the sensor lens 245 from the nozzle 405 (described below). The gap 305 may further be positioned in an upward direction from the sensor lens 245 and in a downward direction from the sensor lens 245. The gap 305 may extend circumferentially around the axis A, e.g., entirely around the axis A. The extent of the gap 305 above and below the sensor lens 245 may help provide smooth airflow across an entirety of the sensor lens 245. The gap 305 may have a constant axial width between the sensor lens 245 and the port 220 circumferentially around the axis A.

Figure 4:
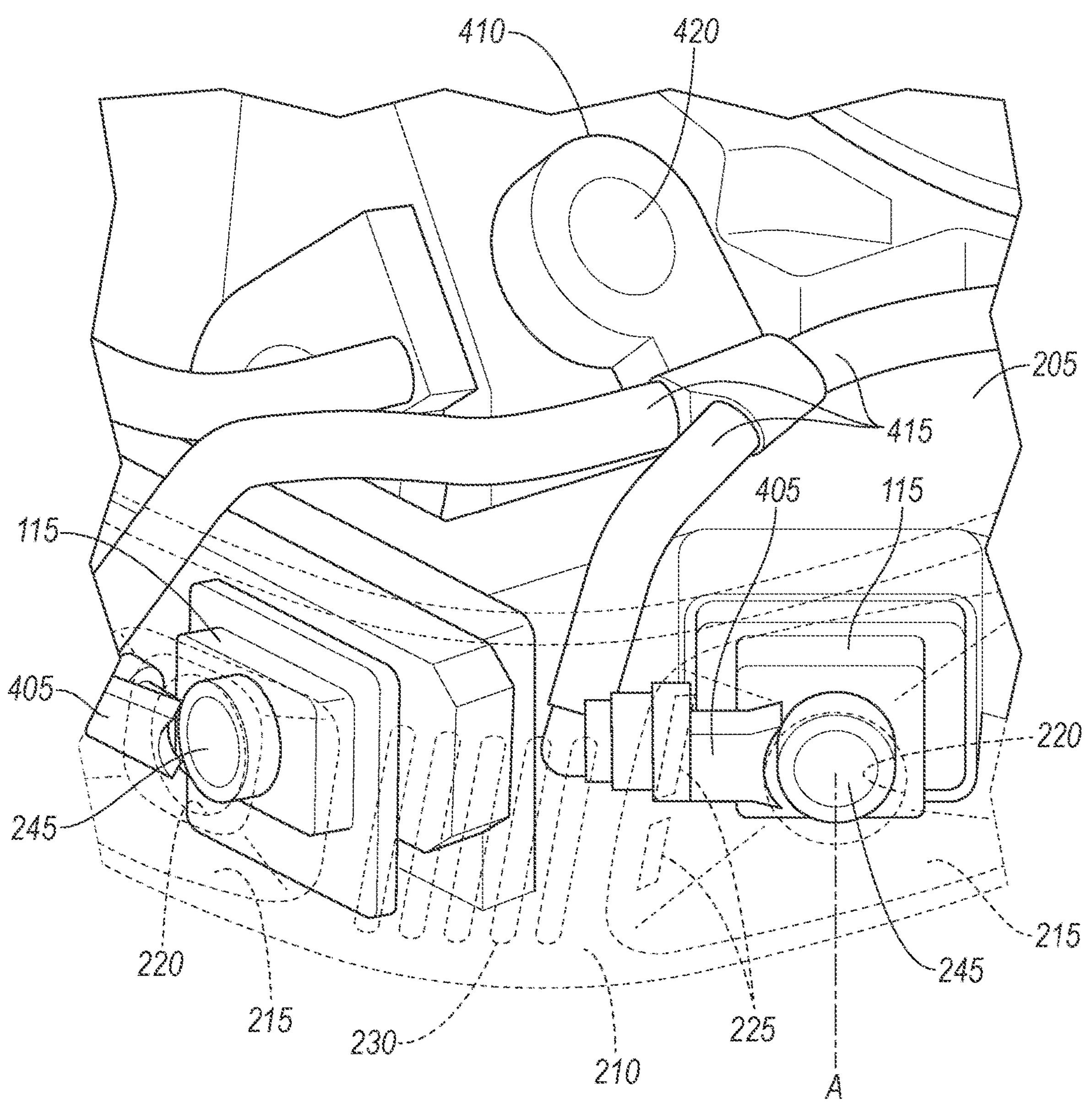
FIG. 4 is a perspective view of a portion of the sensor assembly.

With reference to FIG. 4, the sensor assembly 105 may include a blower 410, ducts 415, and the nozzles 405. The blower 410 and the nozzles 405 are fluidly connected to each other (i.e., fluid can flow from one to the other) in sequence through the ducts 415.

The blower 410 increases the pressure of a gas by reducing a volume of the gas or by forcing additional gas into a constant volume. The blower 410 may be any suitable type of blower, e.g., a positive-displacement blower such as a reciprocating, ionic liquid piston, rotary screw, rotary vane, rolling piston, scroll, or diaphragm blower; a dynamic blower such as an air bubble, centrifugal, diagonal, mixed-flow, or axial-flow blower; or any other suitable type.

The blower 410 is positioned to supply pressurized air to the nozzles 405, e.g., via the ducts 415. The blower 410 is positioned to draw in air from the chamber 205. For example, the blower 410 may include a blower inlet 420, and the blower inlet 420 may be positioned in the chamber 205 and open to the chamber 205.

The ducts 415 are positioned to receive pressurized air from the blower 410 and to direct that pressurized air to the nozzles 405. For example, the ducts 415 may extend from the blower 410 to the nozzles 405. The ducts 415 may be positioned in the chamber 205, e.g., may extend through the chamber 205 from the blower 410 to the nozzle 405. The ducts 415 may be, e.g., flexible hoses.

The nozzles 405 may be fixed relative to the respective sensors 115, e.g., the respective sensor lenses 245. The nozzles 405 may be aimed at the respective sensors 115, e.g., positioned to direct airflow out of the nozzles 405 across the respective sensor lenses 245, e.g., at an oblique angle. The nozzles 405 may be positioned to discharge through the respective ports 220. For example, the nozzles 405 may be positioned between the respective ports 220 and the respective sensor lenses 245 along the respective axes A, e.g., in the respective gap 305. The nozzle 405 is thus positioned in the chamber 205. The nozzles 405 may be positioned in the first direction F, e.g., in a vehicle-forward direction, from the respective sensors 115. The nozzles 405 may be oriented to blow horizontally across the respective sensor lenses 245, e.g., opposite the first direction F, e.g., in a horizontal vehicle-rearward direction. The horizontal orientation of the nozzles 405 may minimize interference from ambient airflow caused by movement of the vehicle 100.

As the vehicle 100 travels forward, ram air may enter the chamber 205 via the vents 230, and ambient air may flow across the recessed portions 215. Air inside the chamber 205 may exit through the openings 225 and may thereby prevent swirling patterns from forming in the recessed portions 215. The large size of the chamber 205 compared to the vents 230 and the openings 225 (the chamber 205 contains multiple sensors 115) means that air generally does not flow straight from one of the vents 230 to the respective opening 225; instead, pressure differences cause the air inside the chamber 205 to exit through the openings 225. Air in the chamber 205 may be drawn in by the blower 410 and ejected across the sensor lenses 245 by the nozzles 405. The air from the nozzles 405 may be less disrupted by the ambient air because the air from the nozzles 405 is flowing parallel to the air exiting from the openings 225. The air from the openings 225 may thus be protecting the airflow from the nozzles 405.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly comprising:

a housing including a wall, the wall including a recessed portion, the recessed portion including a port, the housing defining a chamber;

a sensor positioned in the chamber and having a field of view extending through the port; and a nozzle aimed at the sensor;

wherein the recessed portion includes an opening to the chamber, the opening spaced from the port in a first direction; and wherein the wall includes a vent to the chamber, the vent spaced from the recessed portion in the first direction.

2. The sensor assembly of claim 1, wherein the recessed portion includes an outer edge circumscribing the recessed portion, and the port is spaced from the outer edge.

3. The sensor assembly of claim 1, wherein the nozzle is positioned to discharge through the port.

4. The sensor assembly of claim 1, wherein the nozzle is positioned in the chamber.

5. The sensor assembly of claim 1, further comprising a blower positioned to supply pressurized air to the nozzle.

6. The sensor assembly of claim 5, wherein the blower is positioned to draw in air from the chamber.

7. The sensor assembly of claim 6, wherein the blower includes a blower inlet, and the blower inlet is positioned in the chamber.

8. The sensor assembly of claim 5, further comprising a duct positioned to receive pressurized air from the blower and extending through the chamber to the nozzle.

9. The sensor assembly of claim 1, wherein the first direction is a horizontal direction.

10. The sensor assembly of claim 1, wherein the housing is shaped to be attachable to a body panel of a vehicle.

11. The sensor assembly of claim 10, wherein the first direction is a vehicle-forward direction relative to the vehicle when the housing is attached to the body panel of the vehicle.

12. The sensor assembly of claim 11, wherein the vent faces in the vehicle-forward direction when the housing is attached to the body panel of the vehicle.

13. The sensor assembly of claim 11, wherein the opening faces away from the vehicle-forward direction when the housing is attached to the body panel of the vehicle.

14. The sensor assembly of claim 1, wherein the sensor defines an axis at a center of the field of view of the sensor, and the sensor is positioned to define a gap along the axis between the sensor and the port.

15. The sensor assembly of claim 14, wherein the gap extends along the port opposite the first direction from the opening.

16. The sensor assembly of claim 14, wherein the gap is open to the chamber.

17. The sensor assembly of claim 14, wherein the nozzle is positioned in the gap.

18. A sensor assembly comprising:

a housing including a wall, the wall including a recessed portion, the recessed portion including a port, the housing defining a chamber; and a sensor positioned in the chamber and having a field of view extending through the port;

wherein the recessed portion includes an opening to the chamber, the opening spaced from the port in a first direction;

wherein the wall includes a vent to the chamber, the vent spaced from the recessed portion in the first direction;

wherein the recessed portion includes an outer edge circumscribing the recessed portion; and wherein the port is spaced from the outer edge.

19. The sensor assembly of claim 18, wherein the opening is spaced from the outer edge.

20. The sensor assembly of claim 18, wherein the recessed portion extends into the chamber from the outer edge to the port.

* * * * *